US012759026B2

(12) United States Patent
Nieminen et al.

(10) Patent No.: US 12,759,026 B2
(45) Date of Patent: Oct. 13, 2026

(54) SAND CLEANING

(71) Applicant: FINN RECYCLING OY, Nuutajärvi (FI)

(72) Inventors: Jukka Nieminen, Nuutajärvi (FI); Toni Wesin, Nuutajärvi (FI); Kalle Kekäläinen, Nuutajärvi (FI)

(73) Assignee: RESAND OY, Nuutajärvi (FI)

( * ) Notice: Subject to any disclaimer, the term of this patent is extended or adjusted under 35 U.S.C. 154(b) by 0 days.

(21) Appl. No.: 18/255,323

(22) PCT Filed: Dec. 3, 2020

(86) PCT No.: PCT/FI2020/050814
§ 371 (c)(1),
(2) Date: May 31, 2023

(87) PCT Pub. No.: WO2022/117905
PCT Pub. Date: Mar. 9, 2022

(65) Prior Publication Data
US 2024/0024930 A1 Jan. 25, 2024

(51) Int. Cl.
*B08B 7/04* (2006.01)
*B08B 7/00* (2006.01)
*B08B 7/02* (2006.01)
*B08B 13/00* (2006.01)
*B08B 15/00* (2006.01)
*B09B 3/40* (2022.01)
*F27B 7/38* (2006.01)

(52) U.S. Cl.
CPC .............. *B08B 7/04* (2013.01); *B08B 7/0071* (2013.01); *B08B 7/0092* (2013.01); *B08B 7/02* (2013.01); *B08B 13/00* (2013.01); *B08B 15/00* (2013.01); *B09B 3/40* (2022.01); *F27B 7/386* (2013.01); *B08B 2215/00* (2013.01)

(58) Field of Classification Search
CPC ....... B08B 7/0071; B08B 7/0092; B08B 7/02; B08B 7/04; B08B 13/00; B08B 15/00; B08B 2215/00; B09B 3/40; F27B 7/386
See application file for complete search history.

(56) References Cited

U.S. PATENT DOCUMENTS 4,144,088 A 3/1979 Adams
4,306,961 A * 12/1981 Taciuk .................... C10G 1/02 208/427
4,700,766 A * 10/1987 Godderidge ............. B22C 5/18 164/412

(Continued)

OTHER PUBLICATIONS

International Search Report and Written Opinion of the ISA for PCT/FI2020/050814 mailed Apr. 1, 2021, 14 pages.

(Continued)

*Primary Examiner* — Joseph C Rodriguez
(74) *Attorney, Agent, or Firm* — Nixon & Vanderhye PC

(57) ABSTRACT

A system (1), and method for cleaning sand, which system (1) is a modular system and comprising at least a cleaning module (2). The cleaning module (2) comprising a cleaning apparatus (22) comprising an oven (5), and a cooling drum (6). The system (1) is configured to thermally clean the sand in the heated oven (5), remove gases and fine fraction from the thermally cleaned sand, cool the thermally cleaned sand in the cooling drum (6), and remove gases and fine fraction from the cooling drum (6).

28 Claims, 3 Drawing Sheets

(56) References Cited

U.S. PATENT DOCUMENTS

| | | | | | |
|---|---|---|---|---|---|
| 4,818,373 | A * | 4/1989 | Bartholic | C10G 1/04 | 280/177 |
| 5,253,698 | A * | 10/1993 | Keough | B22D 31/007 | 164/269 |
| 5,565,046 | A | 10/1996 | Crafton et al. | | |
| 8,226,820 | B1 * | 7/2012 | Wegner | C10G 1/045 | 208/390 |
| 9,434,887 | B2 * | 9/2016 | Kift | C10G 1/04 | |
| 2002/0134550 | A1 * | 9/2002 | Leeson | E21B 21/066 | 166/266 |
| 2006/0103059 | A1 | 5/2006 | Crafton et al. | | |
| 2020/0333074 | A1 | 10/2020 | Wesin et al. | | |

OTHER PUBLICATIONS

Aug. 16, 2024 Search Report issued in European Patent Application No. 20964206.5, pp. 1-7.

* cited by examiner

SAND CLEANING

CROSS-REFERENCE TO RELATED APPLICATION

This application is the U.S. national phase of International Application No. PCT/FI2020/050814 filed Dec. 3, 2020, which designated the U.S., the entire contents of which are hereby incorporated by reference.

FIELD OF THE INVENTION

The present invention relates to sand cleaning. More specifically, the present application relates to cleaning sand with an apparatus.

BACKGROUND

The amount of used sand has been increased remarkably over the past years. This waste sand generated in industry imposes a huge burden on the environment and rises production costs, especially as waste costs continue to rise. It would be ecologically reasonable to develop a sand cleaning process in which the share of recycled sand in the industry would increase.

SUMMARY

Various aspects of examples of the invention are set out in the claims. The scope of protection sought for various embodiments of the invention is set out by the independent claims. The examples and features, if any, described in this specification that do not fall under the scope of the independent claims are to be interpreted as examples useful for understanding various embodiments of the invention.

According to a first aspect of the invention, there is provided a system for cleaning sand, which system is a modular system and comprising at least a cleaning module. The cleaning module comprising a cleaning apparatus comprising an oven and a cooling drum. The system is configured to thermally clean the sand in the heated oven, remove gases and fine fraction from the thermally cleaned sand, cool the thermally cleaned sand in the cooling drum, and remove gases and fine fraction from the cooling drum.

According to a second aspect of the invention, there is provided a system for cleaning sand, which system is a modular system comprising at least a cleaning module, an air purification module, and a control module. All the modules of the system are operatively connected to each other. The cleaning module comprising a cleaning apparatus comprising an oven and a cooling drum. The control module is configured to control functions of all the other modules of the system. The system is configured to thermally clean the sand in the heated oven, remove gases and fine fraction from the thermally cleaned sand by an air purification module, cool the thermally cleaned sand in the cooling drum, and remove gases and fine fraction from the cooling drum by the air purification module.

According to a third aspect of the invention, there is provided a cleaning apparatus for cleaning sand, which cleaning apparatus comprising an oven and a cooling drum. The apparatus is configured to thermally clean the sand in the heated oven, remove gases and fine fraction from the thermally cleaned sand, cool the thermally cleaned sand in the cooling drum, and remove gases and fine fraction from the cooling drum.

According to a fourth aspect of the invention, there is provided a method for cleaning sand with a system, which system is a modular system and comprising at least a cleaning module, wherein the cleaning module comprising a cleaning apparatus comprising an oven and a cooling drum. The method comprising: thermally cleaning the sand in the heated oven, removing gases and fine fraction from the thermally cleaned sand, cooling the thermally cleaned sand in the cooling drum, and removing gases and fine fraction from the cooling drum.

According to a fifth aspect of the invention, there is provided a method for cleaning sand with a system, which system is a modular system comprising at least a cleaning module, an air purification module, and a control module. All the modules of the system are operatively connected to each other. The cleaning module comprising a cleaning apparatus comprising an oven and a cooling drum. The control module controls functions of all the other modules of the system. The method comprising: thermally cleaning the sand in the heated oven, removing gases and fine fraction from the thermally cleaned sand by an air purification module, cooling the thermally cleaned sand in the cooling drum, and removing gases and fine fraction from the cooling drum by the air purification module.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE INVENTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Example embodiments relate to a system for cleaning sand, which system is a modular system comprising at least a cleaning module.

More particularly, example embodiments relate to cleaning sand using a cleaning apparatus comprising an oven and a cooling drum.

According to an example embodiment, there is provided a system for cleaning sand, which system is a modular system comprising at least a cleaning module, wherein the cleaning module comprising a cleaning apparatus comprising an oven and a cooling drum. The system is configured to: thermally clean the sand in the heated oven, remove gases and fine fraction from the thermally cleaned sand, cool the thermally cleaned sand in the cooling drum, and remove gases and fine fraction from the cooling drum.

A modular system means a system where at least one module may perform or fulfil some specified function and may be replaced by another module, independently of the other modules. It may also be possible to add more modules with different, new function to the current modular system. In this specification, any of the modules, like a cleaning module, an air purification module, and a control module, may also be simply referred to as a module. Also, all modules are so small that they may be fitted on a platform of a truck and moved from one place to another.

Sand to be cleaned may be any sand suitable to be cleaned with a cleaning apparatus comprising an oven and a cooling drum. The sand may comprise organic impurities. For example, foundry sand that is used in foundries may be cleaned to be used again in the foundries or somewhere else.

Use of natural and virgin sand should be reduced. Virgin sand is sand used as the casting sand, for example. An environmentally friendly and sustainable waste sand cleaning process that saves energy and environment is needed.

In the following, different exemplifying embodiments will be described using, as an example of a system or an apparatus to which the embodiments may be applied, without restricting the embodiments to such a system or an apparatus, however. It is obvious for a person skilled in the art that the embodiments may also be applied to other kinds of systems or apparatuses having suitable means to clean sand appropriately.

Figure 1:
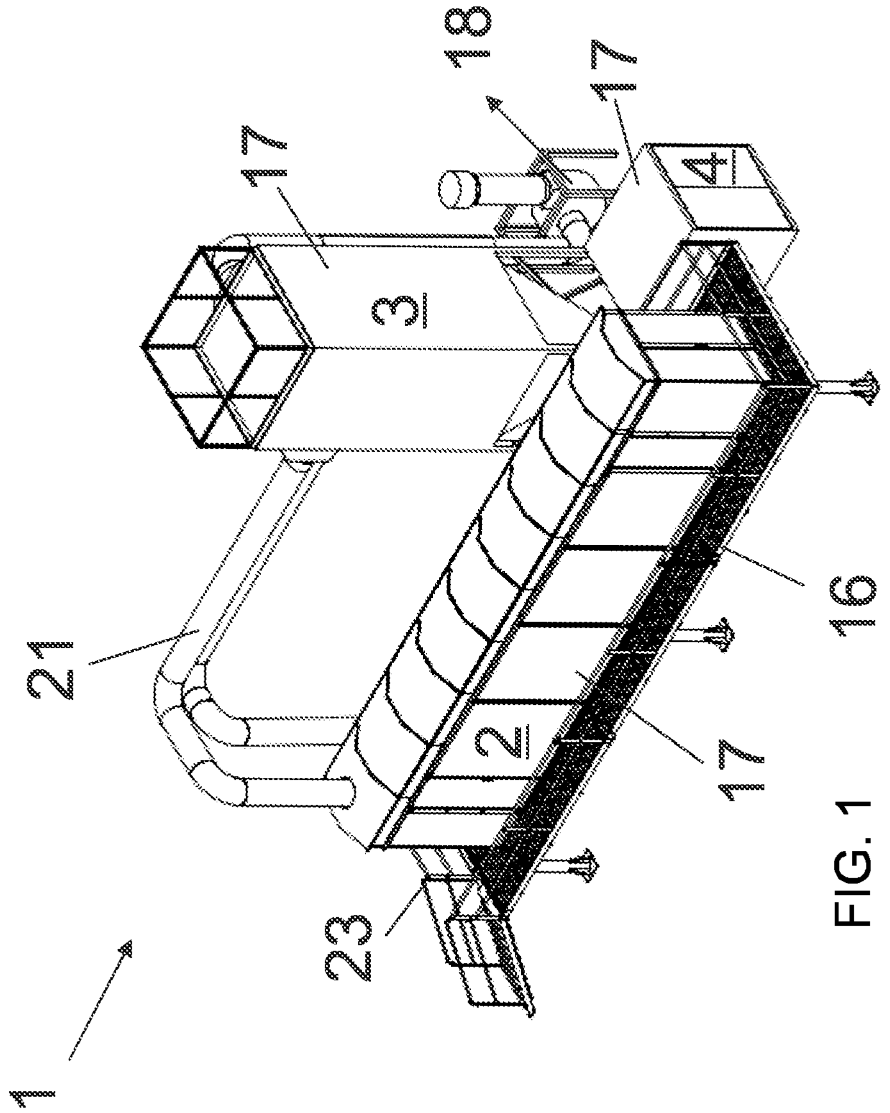
FIG. 1 shows an exemplifying system in which examples of disclosed embodiments may be applied.

FIG. 1 depicts examples of simplified system only showing some elements and functional entities, whose implementation may differ from what is shown. The connections shown in FIG. 1 are connections, whose implementation may be different. It is apparent to a person skilled in the art that the system may comprise also other functions and structures than those shown in FIG. 1.

The embodiments are not, however, restricted to the system or apparatus given as an example but a person skilled in the art may apply the solution to other systems or apparatuses provided with necessary properties.

The example of FIG. 1 shows a system 1 that is a modular system, which comprises at least a cleaning module 2, an air purification module 3, and a control module 4. The system may also comprise other modules, even though they have not been shown in the FIG. 1. According to an example embodiment, the system 1 comprises a cleaning module 2. The cleaning module 2 may clean the sand thermally and cool it. The cleaning module 2 may comprise a cleaning apparatus 22 comprising an oven 5 and a cooling drum 6, shown in FIG. 2. According to an example embodiment, the air purification module 3 may comprise a suction device 18 configured to remove gases and fine fraction from the sand. The control module 4 may control functions of at least one module of the system, for example, cleaning module 2 and/or air purification module 3. Without limiting the scope of the claims, an advantage of the modular system 1 is that it may be built from different modules in a way that meets the customer's needs. This way different modules of the system may be assembled into a customized modular system that is individually suitable for the customer.

According to an example embodiment, a cooling drum 6 is located directly below the oven 5. According to another example embodiment, the cleaning module 2 comprises support structure that allows the oven 5 and cooling drum 6 to be placed on top of each other. According to an example embodiment, length of the cleaning module 2/or the cleaning apparatus 22 is about 9-12 m, height is about 2-5 m, and width is about 1-5 m. According to another example embodiment, length of the cleaning module 2 is about 11 m, height is about 5 m, and width is about 4 m. Without limiting the scope of the claims, an advantage of the modules is that the system 1 is considerably smaller than traditional cleaning plants, thus making it easy to transport modules and fit the system 1 on the customer's premises.

According to an example embodiment, the cleaning module 2 comprises a cover unit 17 inside of which at least the cleaning apparatus 2 is placed. At least one module may have a cover unit 17 inside of which functionality of at least one module is placed. The cover units 17 may protect modules from different weather conditions and prevent people from injuring themselves when the cleaning process is in progress. Without limiting the scope of the claims, an advantage of the cover unit is that the system 1 may be installed outdoors, so it does not take up space inside the building.

According to an example embodiment, the cleaning module 2 comprises maintenance levels 16 and safety fences 23 to help with maintenance work and prevent people from falling.

According to an example embodiment, all the modules of the system are configured to comprise coupling means for connecting modules to each other. Coupling means may comprise at least one of the following: pipe connection, electrical connection, fixed and/or wireless connection. Electrical connection may comprise power line, plug and socket, for example. Also, all kind of quick connectors may be used. The fixed or wireless connection may be, for example, Bluetooth, WLAN, a local area network (LAN), a radio network, such as a telephone network, a cloud service or the Internet for forwarding the data to at least one server, or for receiving data from at least one server. For example, the air purification module 3 is connected to the cleaning 2 module with at least one tube 21 and to the control module 4 with at least one fixed connection. As another example, the control module 4 is connected to the cleaning module 2 and the air purification module 3 with at least one fixed connection. Still another example, the cleaning module 2 is connected to the air purification module 3 with at least one tube 21 and to the control module 4 with at least one fixed connection. Connections between the modules may be physical or non-physical.

According to an example embodiment, the modules of the system are configured to be replaceable by a module comprising the same function, independently of the other modules and/or at least one new module for different function is configured to be addable to the system. According to an example embodiment, the system may comprise at least one of the following modules: a cleaning module 2, an air purification module 3, a control module 4, a gravity separator module configured to separate the particles from the cooled sand, a desulphurisation module, and/or a conveyor module configured to feed the sand to be cleaned to the oven 5. According to an example embodiment, it is possible to have the modular system comprising basic modules, like the cleaning module 2, the air purification module 3, and the control module 4. According to another example embodiment, it is possible to have the modular system comprising basic modules with extra modules, like the gravity separator module, the desulphurisation module, and the conveyor module. For example, the client may want to buy the basic module first and later add extra modules. Without limiting the scope of the claims, an advantage of the modules is that it is easy to update modules, for example, change an old module to a newer one with similar or additional functionalities.

According to an example embodiment, at least one module of all the modules is physically separated from at least one module. According to an example embodiment, all the modules are physically separated from each other. For example, all the modules are arranged inside own cover units 17. According to an example embodiment, the system comprises at least one cover unit 17 inside of which at least one module is placed. According to an example embodiment, the cleaning module 2, control module 3, and air purification module 4 are physically arranged inside different cover units 17. Also, at least two modules may physically be arranged inside the same cover unit 17. For example, the cleaning module 2 and the gravity module 15 are installed inside the same cover unit 17 or the cleaning module 2, the gravity module 15, and the conveyor module are installed inside the same cover unit 17.

According to an example embodiment, the system is a movable modular system. Without limiting the scope of the claims, an advantage of the modules is that it is easy to move different modules from one place to another, because the size of the units is arranged to fit on a platform of transport means such as a truck. According to an example embodiment, the cleaning module 2 is configured to fit on a platform of a truck, and/or the air purification module 3 and the control module 4 are configured to fit together on a platform of a truck, thus making transportation of the modules easy.

According to an example embodiment, the modules comprise all the needed functionalities built inside of them. Ready-made modules may be transported to a client by a truck. The modules are prefabricated, so it is easy to connect the modules together at the customer. The modular system 1 may be assembled inside or outside the building. Cover units 17 may protect the modules from different weather conditions. Without limiting the scope of the claims, an advantage of the modular system 1 is that it may be placed close to the factory, like foundry, so it may be easy to clean waste sand at the customer premises. As a result, only little amount of waste sand may be generated and the cleaned sand may be used again, for example, in the foundry. There may be no need to transport the sand to a landfill, thus saving costs and nature.

Figure 2:
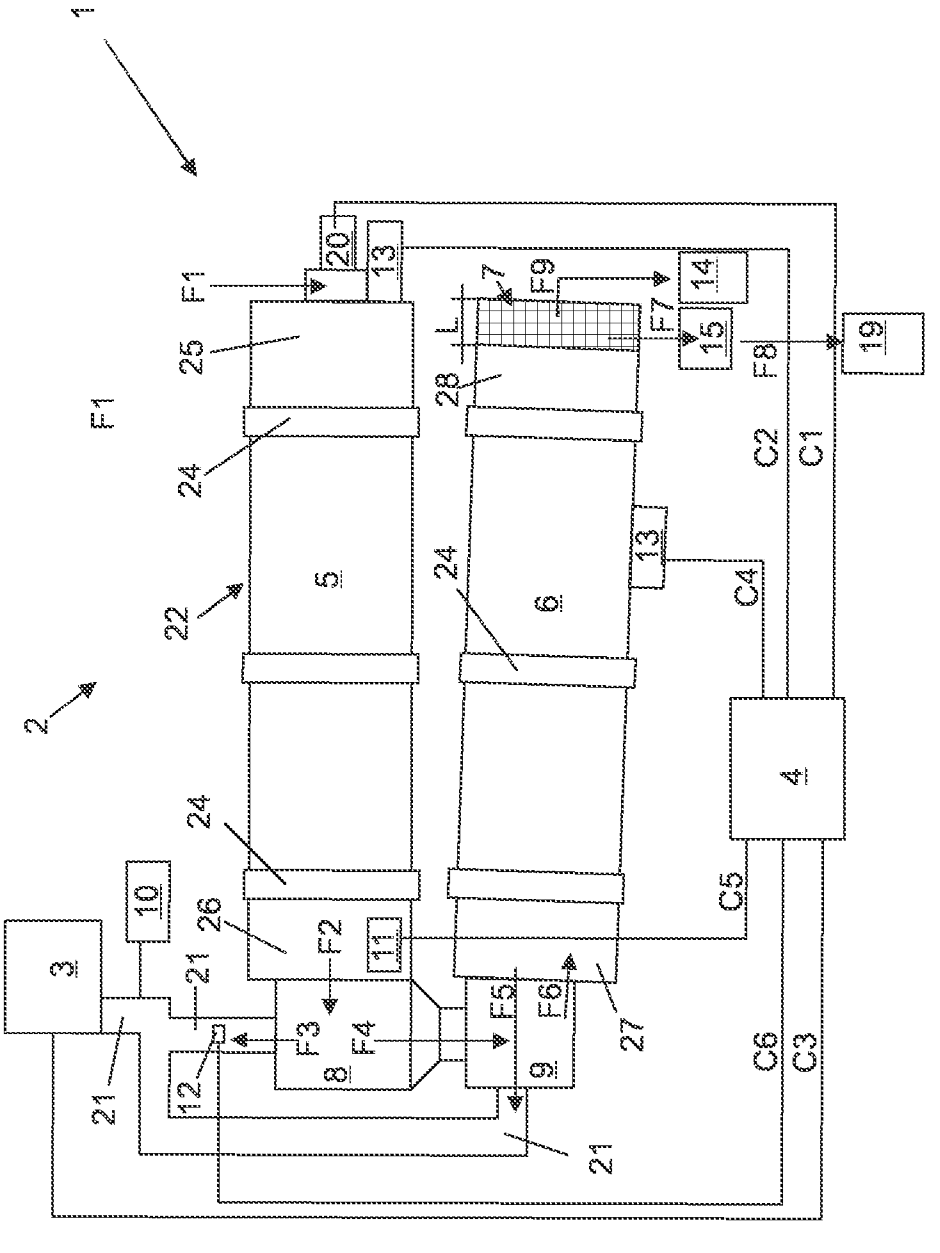
FIG. 2 shows another exemplifying system in which examples of the disclosed embodiments may be applied.

The example of FIG. 2 shows an exemplifying system 1.

FIG. 2 is a block diagram depicting a system 1 for cleaning sand with a modular system 1 operating in accordance with an example embodiment of the invention. In the example of FIG. 2 the system 1 comprises a cleaning module 2, an air purification module 3, and a control module 4.

According to an example embodiment, the cleaning module 2 comprises a cleaning apparatus comprising an oven 5 and a cooling drum 6. Sand to be cleaned may be fed to the oven 5 as schematically shown by the arrow F1 in FIG. 2. The sand to be cleaned may be pre-treated so that there is no gobs or lumps.

The sand to be cleaned may be sand comprising organic impurities, for example, discarded foundry sand. On the surface of the grain of discarded foundry sand may be a clay-based binder film by means of which a mould made of sand may be hardened. Said binder film is typically of bentonite, but instead of bentonite said binder film may also be of another clay-based binder, such as kaolinite. It has been established that the clay-based binder film on the surface of the grain of sand prevents the reaction between the silica in the grain of sand and the compounds of alkalis present in particular in the ash of biofuels, or at least reduces it. Therefore, it prevents the sintering of sand, or at least decreases it.

According to an example embodiment, the cleaning module 2 may comprise abrasive means configured to rub the thermally cleaned sand. The abrasive means may be placed inside the cooling drum 6, wherein the sand is rubbed and cooled at the same time. According to an example embodiment, the abrasive means comprise at least two rollers rotating in opposite directions. In other words, one roller may rotate clockwise and the other counterclockwise. When sand grains trap between the rollers, they may be rubbed and compressed, whereby the clay-based binders detaches from the surface of the sand grain. The rollers may be as long as the cooling drum 6 and their surfaces may be smooth or wavy, for example. How close the rollers are each other may determine the compressive force of the rollers. The controlling module 4 may adjust the position of the rollers. Rubbing may remove clay-based binder, like bentonite or kaolinite, from the surface of the grain of the sand.

Without limiting the scope of the claims, an advantage of the sand cleaning may be that the quality of the cleaned sand may be better because the corners of the sand grains may become worn and grounded in the sand cleaning process, whereby the bonds between the round grains of sand, for example in casting, may become more durable, thus making the mold stronger.

According to an example embodiment, the system comprises a conveyor module configured to feed F1 the sand to be cleaned into the oven 5. The conveyor module may comprise a belt or a screw conveyor, for example. The operation of the conveyor, that is, stopping, starting, and speed, may be controlled with a motor driving the conveyor, but not shown in FIG. 1 for reasons of clarity. The operation of said motor may in turn be controlled by the control unit 4. According to an example embodiment, an additive is added before conveyor module to improve the cleaning of certain impurities in thermal recovery. The additives used may be very steadily mixed with the sand being cleaned. For such a purpose, mixers have been designed which are known per se and therefore not described in detail in this context. Mixing is important from the viewpoint of the outcome. The concentration of the additive should be constant as concerns the sand mass being cleaned. The dosage of an additive may be determined by the initial data measured and obtained from the sand to be cleaned by a sensor and may be controlled by the control unit 4.

As shown in FIG. 2, the sand to be cleaned is fed into the oven F1 for cleaning advantageously at a first end of the oven 25. Heat energy produced by a heat source 20 may be fed to the oven 5. The heat energy fed to the oven 5 is advantageously fed to the oven 5 at the first end 25 of the oven 5. Heat energy may be fed in at another location, too, such as at a second end of the oven 5 or the middle region of the oven 5. As concerns the feeding of the heat energy and the sand, it is essential that the sand moving into the oven 5 may be heated up fast. The sand may be preheated external to the oven 5. A liquid gas burner, for example, may act as the heat source 20. According to an example embodiment, a temperature of the oven 5 may monitored with at least one temperature sensor 11 when adjusting the amount of heat energy fed in, because when using the liquid gas burner, for example, the usual adjustments on the liquid gas burner may prove out to be more effective due to the impurities furthering the combustion process. The oven 5 may be in a thermal insulation material to reduce thermal loss. Thermal loss may be recovered and used, for example, for preheating the sand to be cleaned, or as a heat source of one or more properties. The oven 5 may substantially be supported by supports 24. There may be means advantageously arranged to the supports 24 for adjusting the inclination of the oven 5. The inclination adjustment arrangement may also have been implemented in another manner, to tilt the entire oven 5, for example. According to an example embodiment, the cleaning apparatus 22 has a motor 13 configured to rotate the oven

5 and to adjust the rotating speed. The operation of the heat source 20, motor 13, and the sensor 11 may be controlled, for example, with the control module 4 using the corresponding control signals C1, C2 and C5.

The example of FIG. 2 shows that the sand is entered F1 into the oven 5 from the first end 25 and then thermally cleaned by rotating it. The direction of travel of the sand may be from right to left in FIG. 2. According to an example embodiment, the direction of travel of the sand is from the first end of the oven 25 to the second end 26. According to an example embodiment the oven 5 may be tilted down, for example, in the direction of travel of the sand so that the first end of the oven 25 is higher than the second end 26, so that the second end 26 is directed towards the direction of travel of the sand. After thermally cleaning the sand it may be led out F2 from a second end of the oven 26 to a first container 8, whereof the sand may be dropped F4 to the second container 9 below the first container 8, and from there it may be led F6 to a first end of the cooling drum 27, wherein the sand may be cooled by rotating the thermally cleaned sand by the cooling drum 6. After cooling the sand is ready for use.

The cooling drum 6 may substantially be supported by supports 24. There may be means advantageously arranged to the supports 24 for adjusting the inclination of the cooling drum 6. The inclination adjustment arrangement may also have been implemented in another manner, to tilt the entire cooling drum 6, for example. According to an example embodiment, the cleaning apparatus 22 has a motor 13 to rotate the cooling drum 6 and to adjust the rotating speed. The motor 13 may also rotate abrasive means. The operation of the motor 13 may be controlled, for example, with the control module 4 using the corresponding control signal C4.

According to an example embodiment, the air purification module 3 comprises a suction device 18 for removing gases and fine fraction from the thermally cleaned sand and from the cooling drum 6. The gases and fine fraction from the thermally cleaned sand from the oven 5 may be led F3 from the first container 8 to the tube 21, wherein a suction device 18 sucks them inside the air purification module for further cleaning. According to an example embodiment, the tube 21 may comprise at least one sensor 12 to measure oxygen concentration of the air coming from the oven 5. The sensor 12 may be located close to the connection of the tube 21 and the container 8. This sensor 12 may be used to control the operation of heat source 20 and motor 13 of the oven by the control module 4 using to the corresponding control signal C6. The control module 4 may also control use of the air purification module 3 by using a control signal C3.

According to an example embodiment, the gases and fine fraction in the cooling drum 6 are removed in the opposite direction as the sand to be cooled moves. In other words, the sand to be cooled may move from the first end of the cooling device 27 to the second end 28 when the cooling drum 6 may be rotated, wherein the air may move from the second end 28 of the cooling device 6 to the first end 27. Replacement air may be introduced into the cooling drum 6 from the second end of the cooling drum 28. The gases and fine fraction may be sucked F5 by the suction device 18 of the air cleaning module 3 from the first end of the cooling drum 27 to the tube 21. This may provide an air stream that absorbs the gases and fine fraction against the direction of sand flow in the cooling drum 6. Upstream suction of air may increase the cooling effect of the air in the cooling drum 6.

According to an example embodiment, the gases and fine fraction are removed F3, F5 from the thermally cleaned sand and from the cooling drum 6 by an air purification module 3 to the two tubes 21, which are united to form one tube 21 before the air purification module 3. In this case, the hot air from the oven 5 may be cooled by the air from the cooling drum 6 before the air enters to the air purification module 3 in the tube 21. The gases and fine fraction may be processed with appropriate filter arrangements in the air purification module 3 and cooled down to recover heat.

The example of FIG. 2 shows that the sand is entered into the cooling drum 6 from the first end 27 of the cooling drum 6 and then cooled by rotating it. The direction of travel of the sand may be from left to right in FIG. 2 or from the first end of the cooling drum 27 to the second end 28. According to an example embodiment, the cooling drum 6 is tilted down in the direction of travel of the sand so that the first end of the oven 27 is higher than the second end 28, so that the second end 28 is directed towards the direction of travel of the sand. After cooling the sand, it may be led out from the second end of the cooling drum 28.

Figure 3:
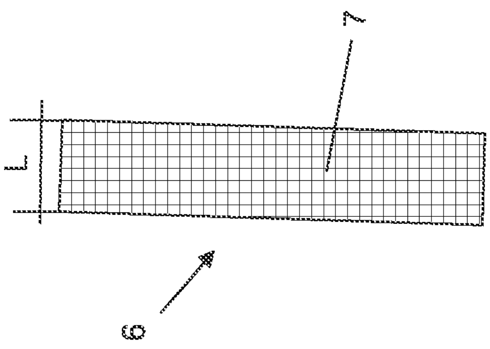
FIG. 3 shows an example of filtering means.

According to an example embodiment, the cooling drum 6 comprises a filter means 7 to screen the cooled sand. The filter means 7 may be a perforated plate or a mesh, for example. The example of FIG. 3 shows the filtering means 7 of the cooling drum 6. According to an example embodiment, the filtering means 7 are attached to the second end of the cooling drum 28 by fixing means. In the other words, the filtering means 7 may be fixed around the end of cooling drum 28, by fixing means, like screws or welding. The filtering means 7 may be attached outside of the cooling drum 6.

It may be seen from the example of FIG. 3 that the filtering means 7 have length L 50-70 cm, for example. The mesh size is about 1 mm, for example. The filtering means 7 mesh size may be selected so that it passes, or separates, all the grains of sand smaller than the filtering means 7 size in question from the sand and leads them out of the cooling drum 6 as schematically shown by the arrow F7 forming a so-called fraction suitable for end use. The filtering means 7 may be located at the second end of the drum 28. When the cooling drum 6 rotates, the sand travels down to the other end of the drum 28, causing the sand to rub against the filtering means 7 that filters some of the sand. The portion of the sand, which did not pass through the filtering means 7 ends up in a first collecting tray 14 as schematically shown by the arrow F9. The portion of the sand, which ended up in the first collecting tray 14, may be sent on for further processing.

According to an example embodiment, the system comprises a gravity separator module 15 for separating the particles from the cooled sand, for example, chromite particles. The example of FIG. 2 shows that the cooled sand is directed to the gravity separator 15 according to the arrow F7 and from there the separated sand is led F8 to the use to the second collecting tray 19.

According to an example embodiment, the system comprises a desulphurisation module 10 for removing sulfur emissions from the gases. According to another example embodiment sulfur emissions are eliminated by feeding lime to the air to be cleaned, for example, inside the tube 21. The desulphurisation module 10 may be connected to the tube 21 and located before the air purification module 3.

According to an example embodiment, the system comprises at least one sensor 11, 12 to measure properties of the sand and/or air. According to an example embodiment, the system 1 comprises at least one actuator, wherein the system, for example control module 4, is arranged to monitor data conveyed by at least one sensor 11, 12 and to control at least one actuator of the system 1 by utilizing the monitored data conveyed by the at least one sensor 11, 12. According to an example embodiment, the actuator comprises a suction device 18, a heat source 20 and/or a motor 13.

One or more actuators of the system 1 may be controlled by control module 4, which may also monitor the values of the sensors 11, 12 in the system, and utilize the information when controlling the actuators. The control module 4 may also be provided with different kind of starting data, initial data. The control module 4 may use these when it determines the most suitable parameters for the different actuators to thermally recover, clean, and cool the sand coming in to be processed at each time. In addition, to the initial data, details on the future planned use of the sand, or the desired purity grade of the cleaned sand may be needed. A batch of sand may, for example, be recovered back to foundry use, so clean even that it replaces part of the virgin sand at the foundry, or even all the virgin sand. A batch of sand, or part of it, may also be cleaned somewhat more lightly, too, so that after cleaning the sand is no longer classified as waste but can be used for another use.

According to an example embodiment, when the sand is thermally cleaned, essential in the adjustment of the heat source 20, in addition to monitoring the temperature of the oven 5, is at least the amount of sand fed in the oven 5, its advancing speed in the oven 5 and cleaning requirement, as well as what sort of impurities there are in the sand, and how clean the obtained sand must be. For example, when the sand is thermally cleaned, there must be enough air space for the discharge of impurities. The impurities may be removed with the flue gasses, so the amount of sand in the oven 5 may be kept sufficiently low. In other words, the sand to air mixture ratio may also be monitored, for example with oxygen concentration sensor 12. The larger the amount of sand in the oven 5 is, the worse may the impurities from among the sand exit with the flue gasses.

According to an example embodiment, the module 4 uses the information it has received concerning each time instant on the oven 5 temperature at any one time, amount of sand fed in the oven 5, advancing speed of the sand, temperature of the sand to be cleaned as it is being fed into the oven 5, temperature of exiting sand, amount of heat energy fed in, heat losses in different parts of the apparatus, and temperature and oxygen concentration of exiting flue gasses as well as other possible measured values as return data to perform future controls and adjustments. For measuring all above mentioned temperatures and processes all kind of sensors may be used.

Therefore, the control module 4, by means of the return data, may be configured to make corrective adjustment actions, to reach the target settings given to the control module 4. The control module 4, may determine, for example, target values for the average temperature of the sand, the cleaned sand that is let run, exiting gasses, or any combination of the above. It is also possible to set a target for the advancing speed of the sand, and by monitoring the realized values obtained as the return data the control module 4 is able to determine whether the target was realized and carry out required changes, if the realization calculated according to the return data does not correspond with the target.

According to an example embodiment, there is provided a cleaning apparatus 22 for cleaning sand, which cleaning apparatus 22 comprising an oven 5 and a cooling drum 6. According to an example embodiment, the cleaning apparatus 22 is the cleaning apparatus 22 presented in FIG. 2. The apparatus may be configured to thermally clean the sand in the heated oven 5, remove gases and fine fraction from the thermally cleaned sand, cool the thermally cleaned sand in the cooling drum 6, and remove gases and fine fraction from the cooling drum 6.

According to an example embodiment, the cleaning apparatus 22 comprises a gravity separator module 15 for separating the particles from the cooled sand. The cooling drum 6 of the cleaning apparatus 22 may further comprise filtering means 7 to screen the cooled sand and/or abrasive means for rubbing the thermally cleaned sand. The cleaning apparatus 22 may also comprise a suction device for removing gases and fine fraction from the thermally cleaned sand and from the cooling drum 6. In addition, the cleaning apparatus 22 may comprise a conveyor module arranged to feed the sand to be cleaned to the oven and/or a desulphurisation module 10.

According to an example embodiment, the cleaning apparatus 22 comprising at least one sensor 11, 12 to measure properties of the sand and/or air. The cleaning apparatus 22 may further comprise at least one actuator, wherein the cleaning apparatus 22 may be arranged to monitor data conveyed by at least one sensor 11, 12 and to control at least one actuator of the system by utilizing the monitored data conveyed by the at least one sensor 11, 12. The cleaning apparatus 22 may also be configured to fit on a platform of a truck.

Figure 4:
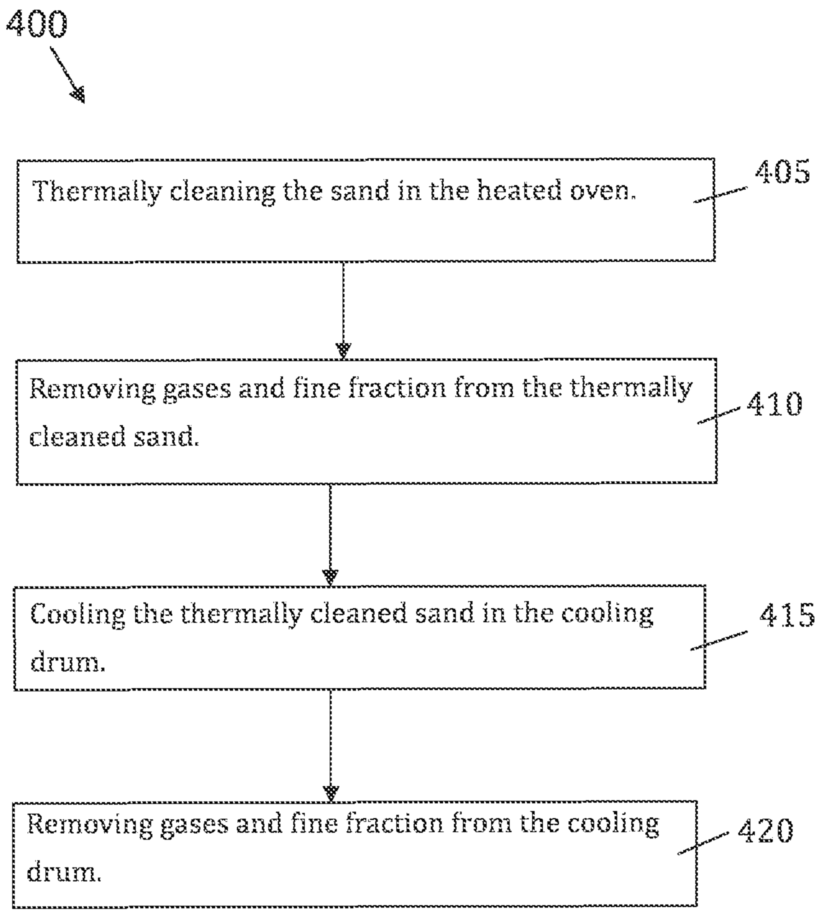
FIG. 4 illustrates an example method according to an example embodiment of the invention.

FIG. 4 illustrates a method 400 incorporating aspects of the previously embodiments. More specifically, the example method 400 illustrates determining an operation to be performed. The method 400 may be performed with system 1, which system 1 may be a modular system 1 and comprise at least a cleaning module 2. All the modules of the system may be operatively connected to each other. The cleaning module 2 may comprise a cleaning apparatus comprising an oven 5 and a cooling drum 6.

The method starts with thermally 405 cleaning the sand in the heated oven 5. The sand may be entered into the oven 5 from the first end of the oven 25 and then thermally cleaned by rotating the sand in the oven 5. The sand may travel from the first end of the oven 25 to the second end 26 when the oven 5 is rotated. Heat energy may be produced by a heat source 20 and the heat energy may be fed to the oven 5. The oven 5 may be tilted down, for example, in the direction of travel of the sand so that the first end of the oven 25 is higher than the second end 26, so that the second end 26 is directed towards the direction of travel of the sand.

The method continues with removing 410 gases and fine fraction from the thermally cleaned sand. The gases and fine fraction may be removed from the thermally cleaned sand by an air purification module 3. The air purification module 3 may comprise a suction device 18 for removing gases and fine fraction from the thermally cleaned sand. The gases and fine fraction from the thermally cleaned sand may be led F3 from the first container 8 to the tube 21, wherein a suction device 18 sucks them inside the air purification module 3 for further cleaning. The gases and fine fraction may be processed with appropriate filter arrangements in the air purification module 3 and cooled down to recover heat.

The method continues with cooling 415 the thermally cleaned sand in the cooling drum 6. The sand to be cooled may move from the first end of the cooling device 27 to the second end 28 when the cooling drum 6 may be rotated and at the same time the air may be sucked with the suction device 18 causing cooling effect. At the same time when cooling the sand, it may be rubbed by abrasive means.

The method continues with removing 420 gases and fine fraction from the cooling drum 6. The gases and fine fraction may be removed from the cooling drum 6 by the air purification module 3. The gases and fine fraction in the cooling drum 6 may be removed in the opposite direction as the sand to be cooled moves. The sand to be cooled may move from the first end of the cooling device 27 to the second end 28 when the cooling drum 6 is rotated. The gases and fine fraction may be sucked F5 by the suction device 18 of the air cleaning module 3 from the first end of the cooling drum 27 to the tube 21. This may provide an air stream that absorbs the gases and fine fraction against the direction of sand flow in the cooling drum 6. Upstream suction of the air increases the air-cooling effect in the cooling drum 6. Replacement air is introduced into the cooling drum 6 from the second end of the cooling drum 28.

Without limiting the scope of the claims, an advantage of cleaning sand with a modular system such that the sand is thermally cleaned and cooled and gases and fine fraction are removed from the sand may be that waste sand may be used more efficiently.

Without limiting the scope of the claims, an advantage of a modular system is that modules may be prefabricated at the factory beforehand and shipped as a ready product for installation. The modular system may be smaller compared to normal stationary sand cleaning plants and complete modules may be transported to the site on the truck platform. The modules may have all the electrification and other connections ready, so it may be easy to lift the modules onto place and connect them to each other, for example with the help of quick connectors. The system may be adjusted to suit each customer during the installation phase, after which the system is ready for use.

Without limiting the scope of the claims, an advantage of a modular system is that factories, like foundries, can reuse their waste sand by purifying it with the system described above. This may reduce sand costs, because there may be no need to buy virgin sand or to transport waste sand to the landfill. At the same time, operations of the factories become more efficient when it may not be dependent on third parties. Recycling of waste sand also may save significantly costs, energy and nature.

Without in any way limiting the scope, interpretation, or application of the claims appearing below, a technical effect of one or more of the example embodiments disclosed herein is that the grains of the cleaned sand are rounder because they have been rubbed against each other more making the quality of the cleaned sand better. Foundry sand may be recycled multiple times.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It will be obvious to a person skilled in the art that, as the technology advances, the inventive concept can be implemented in various ways. The invention and its embodiments are not limited to the examples described above but may vary within the scope of the claims.

The invention claimed is:

1. A system for cleaning sand, comprising:

a cleaning module, the cleaning module comprising a cleaning apparatus comprising:

a rotatable oven configured to contain and tumble the sand, and the rotatable oven comprising a first end configured to receive the sand to be thermally cleaned and a second end configured to expel the sand from the rotatable oven after thermal cleaning;

a heat source configured to heat the rotatable oven to thermally clean the sand contained in the rotatable oven; and a rotatable cooling drum configured to cool the thermally cleaned sand in the rotatable cooling drum, and the rotatable cooling drum comprising a first end configured to receive the sand and a second end configured to expel the sand from the rotatable cooling drum, a first container connected to the rotatable oven at the second end and configured to receive the thermally cleaned sand expelled from the rotatable oven, a second container connected to the first container and configured to receive the thermally cleaned sand from the first container, and the second container being connected to the rotatable cooling drum at the first end and configured to expel the thermally cleaned sand to the rotatable cooling drum, an air purification module, a first tube connected to the first container and configured to convey, from a first inlet of the first tube toward the air purification module, gases and fine fraction to be removed from the thermally cleaned sand via the air purification module, and a second tube connected to the second container and configured to convey, from a second inlet of the second tube toward the air purification module, gases and fine fraction to be removed from the rotatable cooling drum via the air purification module, the first inlet being separate from the second inlet, wherein the first tube and the second tube unite to combine hot air from the rotatable oven with air from the rotatable cooling drum to cool the hot air, and wherein the system is modular.

2. The system as claimed in claim 1, further comprising a control module, wherein:

all the modules of the system are operatively connected to each other; and the control module is configured to control functions of all the other modules of the system.

3. The system as claimed in claim 1, wherein the rotatable cooling drum comprises a filter configured to screen the cooled sand.

4. The system as claimed in claim 1, further comprising a gravity separator module configured to separate particles from the cooled sand.

5. The system as claimed in claim 2, wherein the air purification module comprises a suction device configured to remove gases and fine fraction from the thermally cleaned sand and from the rotatable cooling drum.

6. The system as claimed in claim 1, further comprising a desulphurisation module.

7. The system as claimed in claim 1, further comprising a conveyor module arranged to feed the sand to be cleaned to the heated rotatable oven.

8. The system as claimed in claim 1, wherein the cleaning apparatus comprises an abrasive configured to rub the thermally cleaned sand.

9. The system as claimed in claim 1, wherein:

all the modules of the system are configured to be replaceable by a module comprising the same function, independently of the other modules; and/or at least one new module for different function is configured to be addable to the system.

10. The system as claimed in claim 1, further comprising at least one sensor configured to measure properties of the sand and/or air.

11. The system as claimed in claim 10, further comprising at least one actuator, wherein the system is arranged to monitor data conveyed by at least one sensor and to control the at least one actuator of the system by utilizing the monitored data conveyed by the at least one sensor.

12. The system as claimed in claim 1, further comprising at least one cover unit inside of which at least one module is placed.

13. The system as claimed in claim 2, wherein:

the cleaning module is configured to fit on a platform of a truck; and/or the air purification module, and the control module are configured to fit together on a platform of a truck.

14. A cleaning module comprising a cleaning apparatus for cleaning sand, the cleaning apparatus comprising:

a rotatable oven configured to contain and tumble the sand, and the rotatable oven comprising a first end configured to receive the sand to be thermally cleaned and a second end configured to expel the sand from the rotatable oven after thermal cleaning;

a heat source configured to heat the rotatable oven to thermally clean the sand contained in the rotatable oven;

a rotatable cooling drum configured to cool the thermally cleaned sand in the rotatable cooling drum, and the rotatable cooling drum comprising a first end configured to receive the sand and a second end configured to expel the sand from the rotatable cooling drum;

a first container connected to the rotatable oven at the second end and configured to receive the thermally cleaned sand expelled from the rotatable oven; and a second container connected to the first container and configured to receive the thermally cleaned sand from the first container, and the second container being connected to the rotatable cooling drum at the first end and configured to expel the thermally cleaned sand to the rotatable cooling drum, wherein:

gases and fine fraction to be removed from the thermally cleaned sand via an air purification module are conveyed from the rotatable oven towards the air purification module via a first tube connected to the first container, gases and fine fraction to be removed from the rotatable cooling drum via the air purification module are conveyed from the rotatable cooling drum towards the air purification module via a second tube connected to the second container, and the first tube and the second tube unite to combine hot air from the heated-rotatable oven is coolable with air from the rotatable cooling drum to cool the hot air.

15. A method for cleaning sand in connection with a modular system comprising an air purification module and a cleaning module, wherein the cleaning module comprises a cleaning apparatus comprising a rotatable oven, a heat source, and a rotatable cooling drum, the method comprising:

heating the rotatable oven to thermally clean the sand contained in the rotatable oven;

expelling the sand from the rotatable oven after thermal cleaning into a first container;

conveying the sand from the first container into a second container;

conveying to the air purification module gases and fine fraction to be removed from the thermally cleaned sand from the first container via a first tube;

conveying the sand from the second container into the rotatable cooling drum;

cooling the thermally cleaned sand in the rotatable cooling drum;

conveying to the air purification module gases and fine fraction to be removed from the rotatable cooling drum from the second container via a second tube united with the first tube;

combining hot air from the rotatable oven with air from the rotatable cooling drum where the first tube and the second tube are united to cool the hot air; and removing the gases and fine fraction via the air purification module.

16. The system as claimed in claim 1, further comprising a control module configured to control functions of the other modules of the system, and wherein the cleaning module is a single module containing both the rotatable oven and the rotatable cooling drum.

17. The cleaning module as claimed in claim 14, wherein the cleaning module is a singular module containing both the rotatable oven and the rotatable cooling drum.

18. The method as claimed in claim 15, wherein the cleaning module is a single module containing both the heated rotatable oven and the rotatable cooling drum.

19. The system as claimed in claim 1, wherein the sand is preheated external to the rotatable oven.

20. The method as claimed in claim 15, further comprising preheating the sand external to the rotatable oven.

21. The system as claimed in claim 1, wherein the first and second tubes unite to form a single tube in which the hot air from the heated rotatable oven is coolable with the air from the rotatable cooling drum.

22. The system as claimed in claim 1, wherein the first and second tubes unite upstream of the air purification module.

23. The method as claimed in claim 15, wherein:

the gases and fine fraction to be removed from the thermally cleaned sand are conveyed to the air purification module via a first tube, the gases and fine fraction to be removed from the rotatable cooling drum are conveyed to the air purification module via a second tube, and the first tube and the second tube are at least initially separate but unite so that the hot air from the rotatable oven is cooled with the air from the rotatable cooling drum.

24. The method as claimed in claim 23, wherein the first and second tubes unite upstream of the air purification module.

25. The system as claimed in claim 1, wherein the first tube and the second tube unite to form one tube before the air purification module so that the hot air from the rotatable oven is coolable with the air from the rotatable cooling drum.

26. The cleaning module as claimed in claim 14, wherein the first tube and the second tube unite to form one tube before the air purification module so that the hot air from the rotatable oven is coolable with the air from the rotatable cooling drum.

27. The system as claimed in claim 1, wherein the heat source is positioned at an end of the rotatable oven.

28. The system as claimed in claim 27, wherein the end of the rotatable oven is opposite to the first tube.

* * * * *